US011161492B2

(12) United States Patent
Krautter et al.

(10) Patent No.: US 11,161,492 B2
(45) Date of Patent: Nov. 2, 2021

(54) CONTROL DEVICE AND METHOD FOR OPERATING A SIMULATOR-EQUIPPED HYDRAULIC BRAKE SYSTEM OF A VEHICLE

(71) Applicant: Robert Bosch GmbH, Stuttgart (DE)

(72) Inventors: Andreas Krautter, Steinheim (DE); Rainer Heinsohn, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 566 days.

(21) Appl. No.: 16/043,586

(22) Filed: Jul. 24, 2018

(65) Prior Publication Data

US 2019/0039585 A1 Feb. 7, 2019

(30) Foreign Application Priority Data

Aug. 2, 2017 (DE) .......................... 102017213392.9

(51) Int. Cl.
*B60T 13/62* (2006.01)
*B60T 8/40* (2006.01)
*B60T 7/04* (2006.01)
*B60T 13/14* (2006.01)
*B60T 13/66* (2006.01)
*B60T 13/68* (2006.01)
*B60T 17/22* (2006.01)

(52) U.S. Cl.
CPC .............. *B60T 13/62* (2013.01); *B60T 7/042* (2013.01); *B60T 8/40* (2013.01); *B60T 8/4081* (2013.01); *B60T 13/142* (2013.01); *B60T 13/146* (2013.01); *B60T 13/662* (2013.01); *B60T 13/686* (2013.01); *B60T 17/221* (2013.01)

(58) Field of Classification Search
None
See application file for complete search history.

(56) References Cited

U.S. PATENT DOCUMENTS 5,941,608 A * 8/1999 Campau .................. B60T 7/042
303/113.4
6,149,249 A * 11/2000 Matsuda ................. B60T 8/344
303/114.1

(Continued)

FOREIGN PATENT DOCUMENTS

DE 102014222759 A1 5/2016

*Primary Examiner* — Todd Melton
*Assistant Examiner* — Jason R Roberson
(74) *Attorney, Agent, or Firm* — Norton Rose Fulbright US LLP; Gerard Messina (57) ABSTRACT

A control device operates a vehicle hydraulic brake system (a) in a fallback mode during which a simulator isolating valve is closed and a brake circuit isolating valve is open, (b) in a simulator mode during which the simulator isolating valve is open and the brake circuit isolating valve is closed, and (c) to transition from the fallback mode to the simulator mode using an intermediate mode in which, at least once, the simulator isolating valve and the at least one brake circuit isolating valve are simultaneously closed for a first time interval, the simulator isolating valve and the at least one brake circuit isolating valve are simultaneously open for a second time interval, and the simulator isolating valve is closed for a third time interval, while the at least one brake circuit isolating valve is open at least part of the time during the third time interval.

11 Claims, 5 Drawing Sheets

(56) References Cited

U.S. PATENT DOCUMENTS

| | | | | |
|---|---|---|---|---|
| 6,249,736 B1* | 6/2001 | Schmidt | .................... | B60T 7/12 |
| | | | | 303/115.2 |
| 6,375,282 B1* | 4/2002 | Inoue | ........................ | B60T 7/12 |
| | | | | 303/11 |
| 6,986,335 B2* | 1/2006 | Sieber | ................... | B60W 10/26 |
| | | | | 123/320 |
| 2014/0152082 A1* | 6/2014 | Strengert | .............. | B60T 8/4872 |
| | | | | 303/3 |
| 2017/0282876 A1* | 10/2017 | Oosawa | ................ | B60T 13/143 |

* cited by examiner

CONTROL DEVICE AND METHOD FOR OPERATING A SIMULATOR-EQUIPPED HYDRAULIC BRAKE SYSTEM OF A VEHICLE

CROSS-REFERENCE TO RELATED APPLICATIONS

The present application claims priority under 35 U.S.C. § 119 to DE 10 2017 213 392.9, filed in the Federal Republic of Germany on Aug. 2, 2017, the content of which is hereby incorporated by reference herein in its entirety.

FIELD OF THE INVENTION

The present invention relates to a control device for a simulator-equipped hydraulic brake system of a vehicle. The present invention also relates to a simulator-equipped hydraulic brake system for a vehicle. In addition, the present invention relates to a method for operating a simulator-equipped hydraulic brake system of a vehicle.

BACKGROUND

From the existing art, such as DE 10 2014 222 759 A1, a simulator-equipped hydraulic brake system is known that can optionally be operated in a so-called fallback mode or in a so-called simulator mode. In the fallback mode, a simulator is decoupled from a master brake cylinder via a closed simulator isolating valve, while at least one wheel brake cylinder is coupled to the master brake cylinder via at least one open brake circuit isolating valve. In contrast, in simulator mode, the simulator is coupled to the master brake cylinder via the open simulator isolating valve, and the at least one wheel brake cylinder is decoupled from the master brake cylinder via the at least one closed brake circuit isolating valve.

Figure 1:
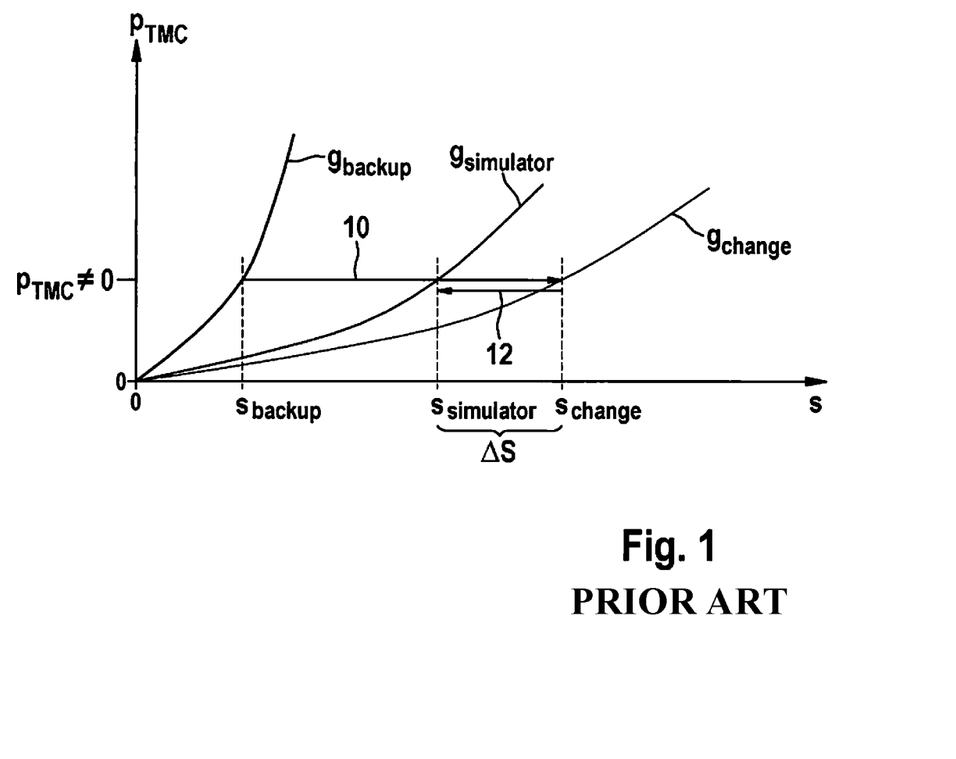
FIG. 1 is a graph that illustrates braking characteristics in a conventional simulator-equipped hydraulic brake system.

FIG. 1 shows a coordinate system for illustrating braking characteristics in a conventional simulator-equipped hydraulic brake system, as described for example in DE 10 2014 222 759 A1, an abscissa of the coordinate system of FIG. 1 indicating a displacement path s of a driver braking force transmission component, positioned before a master brake cylinder of the brake system, from its initial position, and an ordinate of the coordinate system of FIG. 1 indicating a master brake cylinder pressure pmic in the master brake cylinder.

A graph $g_{backup}$ shows a fallback characteristic curve $g_{backup}$ for brakings carried out completely in the fallback mode. In contrast, a graph $g_{simulator}$ corresponds to a simulator characteristic curve $g_{simulator}$ for brakings carried out completely in the simulator mode. For brakings in which the fallback mode is aborted, during the respective braking, through opening of the simulator isolating valve and simultaneous closing of the at least one brake circuit isolating valve, a mode change characteristic curve $g_{change}$ is shown in a graph $g_{change}$. If, during a braking first carried out in fallback mode, the fallback mode is terminated by opening the simulator isolating valve with simultaneous closing of the at least one brake circuit isolating valve, then a volume of brake fluid already pressed out of the master brake cylinder by the at least one brake circuit isolating valve (open during fallback mode) is "lost." A brake actuating element/brake pedal of the brake system therefore reacts to the opening of the simulator isolating valve and the simultaneous closing of the at least one brake circuit isolating valve (given a master brake cylinder pressure $P_{TMC} \neq 0$) with a sudden "sinking" or "slumping," graphically indicated in the coordinate system of FIG. 1 by an arrow 10 and a change from an earlier displacement path $s_{backup}$ to a later displacement path $s_{change}$. On the basis of the at least one closed brake circuit isolating valve, a change is prevented from mode change characteristic curve $g_{change}$ to simulator characteristic curve $g_{simulator}$, as is graphically shown by an arrow 12, or a change from displacement path $s_{change}$ to a displacement path $s_{simulator}$, by a difference $\Delta s$, is prevented.

SUMMARY

Example embodiments of the present invention are directed to a control device for a simulator-equipped hydraulic brake system of a vehicle, a simulator-equipped hydraulic brake system for a vehicle, and a method for operating a simulator-equipped hydraulic brake system of a vehicle.

The present invention provides possibilities for improving a reaction of a brake actuating element/brake pedal to a change, taking place during braking, from fallback mode to simulator mode. In particular, the present invention contributes to preventing the sinking/slumping of the brake actuating element/brake pedal that normally takes place in such a situation. Instead, when the present invention is applied, at most a minimal compensating movement occurs. The present invention thus improves braking comfort for a driver when changing a simulator-equipped hydraulic brake system from fallback mode to simulator mode.

Conventionally, changes from fallback mode to simulator mode during a braking have been avoided (due to the behavior of the brake actuating element/brake pedal, frequently perceived by the driver as unusual or disturbing). Braking could therefore be carried out only in simulator mode if the conditions necessary for this were present already at the beginning of the braking. However, this was frequently not ensured, for example because on-board vehicle voltage was not adequate, or some other error state was present that made operation of the brake system in simulator mode impossible at the beginning of the braking. Even if the preconditions for operating the brake system in simulator mode were soon present again, a transition of the brake system from fallback mode to simulator mode was omitted in order to avoid the sinking/slumping of the brake actuating element/brake pedal. The present invention overcomes this disadvantage.

In most cases no additional brake system components are required for a realization of the present invention in a simulator-equipped hydraulic brake system. Instead, the present invention can be realized by reprogramming an electronics system of such a brake system type.

In an advantageous example embodiment of the control device, the electronics device is in addition designed to compare, before the transition of the brake system from the fallback mode to the simulator mode, a current displacement path of a driver brake force transmission component of the brake system, situated before the master brake cylinder, from its initial position with a specified boundary displacement path, and/or to compare a current master brake cylinder pressure in the master brake cylinder to a specified boundary master brake cylinder pressure, to implement the intermediate mode if the current displacement path of the driver brake force transmission component lies above the specified boundary displacement path and/or if the current master brake cylinder pressure lies above the specified boundary brake cylinder pressure, and, otherwise, to bring about the transition of the brake system from the fallback mode to the simulator mode by opening the simulator isolating valve, with simultaneous closing of the at least one brake circuit isolating valve. The intermediate mode can thus deliberately be implemented only when a sudden sinking/slumping of the brake actuating element/brake pedal is to be expected due to a comparatively large brake fluid volume displaced (during the fallback mode) when there is a "direct transition" from fallback mode to simulator mode.

Preferably, the control device has a storage unit in which there are stored: a fallback characteristic curve that indicates a relationship between the displacement path of the driver brake force transmission component and the resulting master brake cylinder pressure for brakings carried out completely in fallback mode, a simulator characteristic curve that indicates a relationship between the displacement path of the driver brake force transmission component and the resulting master brake cylinder pressure for brakings carried out completely in simulator mode, and a mode change characteristic curve that indicates a relationship between the displacement path of the driver brake force transmission component and the resulting master brake cylinder pressure for brakings in which the fallback mode is aborted, during the respective braking, through opening of the simulator isolating valve with simultaneous closing of the at least one brake circuit isolating valve. In this case, the electronics device is preferably designed to determine a first target opening time of the simulator isolating valve during the intermediate mode and a second target opening time of the at least one brake circuit isolating valve during the intermediate mode, taking into account the fallback characteristic curve, the simulator characteristic curve, the mode change characteristic curve, and the current master brake cylinder pressure. Subsequently, during a subsequent carrying out of the intermediate mode the simulator isolating valve and the at least one brake circuit isolating valve are controlled in such a way that, taking into account the determined first target opening time and the determined second target opening time, a driver will not perceive, or will hardly perceive, the transition of the brake system from the fallback mode to the simulator mode via a changed behavior of the brake actuating element/brake pedal.

For example, the electronics device can be designed to carry out the valve switching program n times when there is a transition of the brake system from the fallback mode to the simulator mode, during the respective intermediate mode, where n is a whole number and is greater than or equal to 2. Advantageously, the electronics device is then designed to define a duration of the second time interval as equal to a quotient of the first target opening time of the simulator isolating valve divided by n.

The advantages described above are also ensured in a simulator-equipped hydraulic brake system for a vehicle having at least one corresponding control device, the master brake cylinder, the simulator, the at least one wheel brake cylinder, the simulator isolating valve via which the simulator is connected to the master brake cylinder, and the at least one brake circuit isolating valve via which the at least one wheel brake cylinder is connected to the master brake cylinder. The simulator-equipped hydraulic brake system can be developed according to the above-explained specific embodiments of the control device.

In addition, a carrying out of a corresponding method for operating a simulator-equipped hydraulic brake system of a vehicle also provides the advantages described above. The method for operating a simulator-equipped hydraulic brake system of a vehicle can also be developed according to the above-explained specific embodiment of the control device.

Further features and advantages of the present invention are explained in the following on the basis of the Figures.

DETAILED DESCRIPTION

Figure 2A:
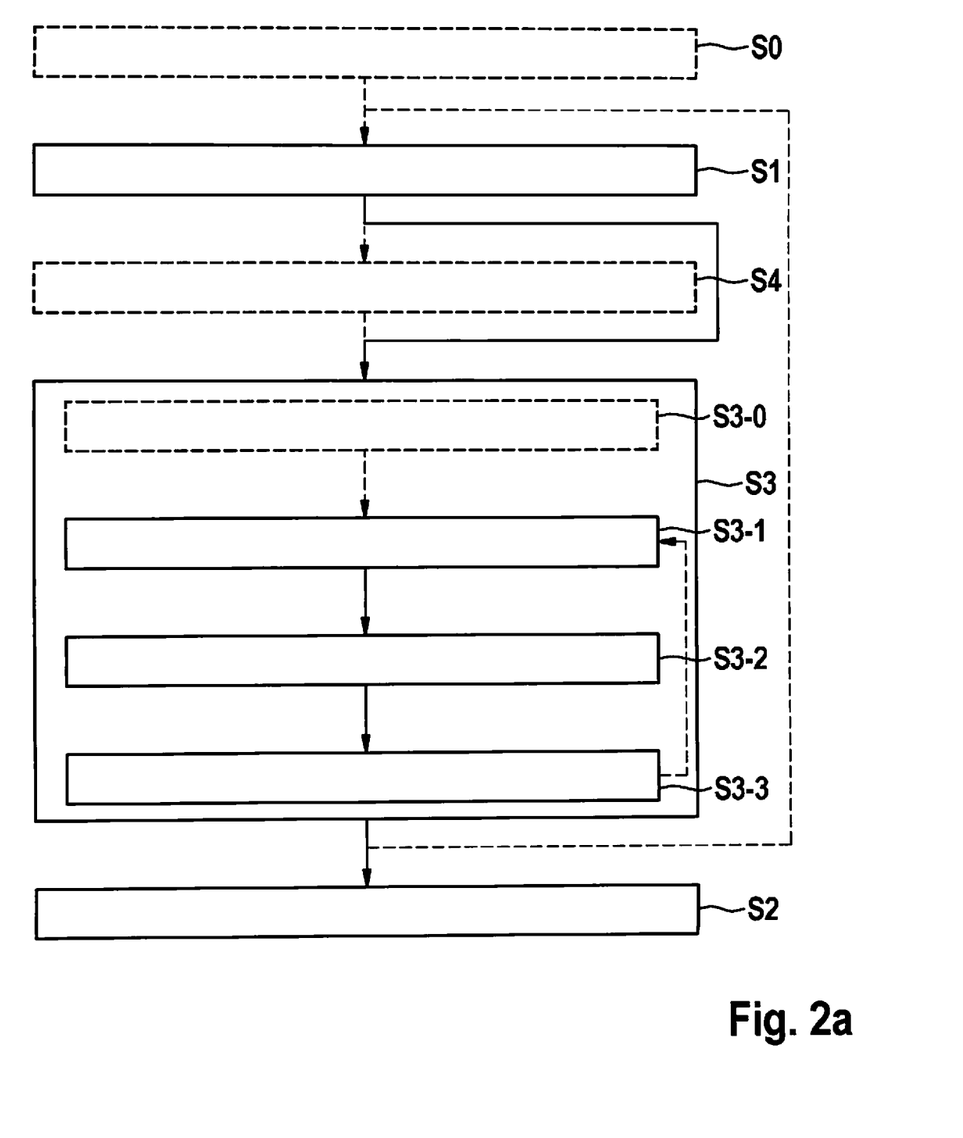
FIGS. 2a-2e are a flowchart and graphs illustrating a first example embodiment of the present invention of a method for operating a simulator-equipped hydraulic brake system of a vehicle.

FIG. 2a is a flowchart that illustrates a method. The illustrated method is not limited to a particular type of brake system of the simulator-equipped hydraulic brake system, and is not limited to a specific vehicle type/motor vehicle type of the vehicle/motor vehicle equipped therewith. During a method step S1 of the method, the brake system is operated in a so-called fallback mode. During fallback mode, a simulator isolating valve of the brake system, via which a simulator of the brake system is connected to a master brake cylinder of the brake system, is controlled/held in its closed state. In contrast, at least one brake circuit isolating valve of the brake system, via which at least one wheel brake cylinder of the brake system is connected to the master brake cylinder, is controlled/held in its open state during the fallback mode. The fallback mode can also be described by saying that the simulator is decoupled from the master brake cylinder (by the closed simulator isolating valve), while the at least one wheel brake cylinder is coupled to the master brake cylinder (via the at least one open brake circuit isolating valve). During the fallback mode, a driver of the vehicle equipped with the brake system can therefore brake into the at least one wheel brake cylinder via his actuation of a brake actuating element (such as a brake pedal) connected (directly or indirectly) to the master brake cylinder, and in this way can use his driver braking force to bring about a buildup of brake pressure in the at least one wheel brake cylinder. A braking of the driver into the simulator is however prevented during fallback mode, due to the closed simulator isolating valve, so that the driver's braking force is (almost) completely used for the buildup of brake pressure in the at least one wheel brake cylinder.

Figure 2B:
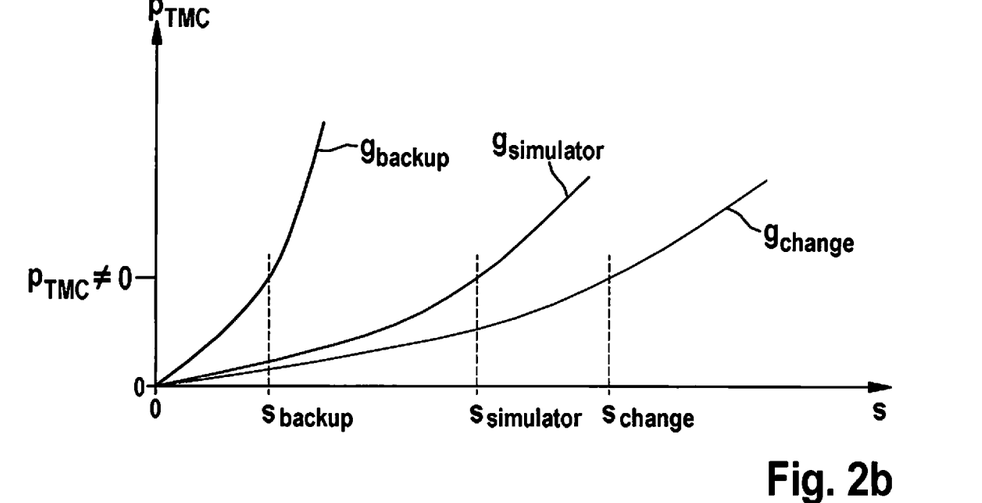

FIG. 2b is a graph illustrating braking characteristics of the brake system, an abscissa of the coordinate system of FIG. 2b indicating a displacement path s of a driver brake force transmission component, positioned before the master brake cylinder of the brake system, from its initial position, and an ordinate of the coordinate system of FIG. 2b indicating a master brake cylinder pressure $p_{TMC}$ in the master brake cylinder. The driver brake force transmission component can for example be understood as a piston rod of the master brake cylinder. A graph $g_{backup}$ shows a fallback characteristic curve $g_{backup}$ for brakings carried out completely in fallback mode (i.e., via method step S1).

Alternatively to the fallback mode, the brake system can also be operated in a so-called simulator mode. During the simulator mode, the simulator isolating valve is controlled/held in its open state, while the at least one brake circuit isolating valve is controlled/held in its closed state. While the at least one wheel brake cylinder is thus decoupled from the master brake cylinder (via the at least one closed brake circuit isolating valve) in simulator mode, in simulator mode the simulator is coupled to the master brake cylinder (via the open simulator isolating valve) in such a way that the driver actuating the brake actuating element brakes into the simulator (via the open simulator isolating valve). A standard/comfortable brake actuation feel/pedal feel of the driver braking into the simulator (via the open simulator isolating valve) can easily be determined using a simulator characteristic curve $g_{simulator}$ for brakings carried out completely in the simulator mode, through a constructive design of the simulator. At the same time, a brake pressure buildup corresponding to a driver's desired braking can be set/regulated in the at least one wheel brake cylinder using at least one motorized brake pressure buildup device.

Normally the driver prefers the simulator mode since in the simulator mode the at least one motorized brake pressure buildup device relieves the driver of having to build up the brake pressure in the at least one wheel brake cylinder by his or her own force. Optionally, the method can therefore begin with a method step S0, carried out at the beginning of the actuation of the brake actuating element by the driver. In method step S0, it is investigated whether the brake pressure buildup requested by the driver in the at least one wheel brake cylinder is possible through operation of the brake system in simulator mode, or whether the brake system has to be operated at least transitionally in fallback mode in order to bring about the brake pressure buildup. If in method step S0 it is determined that the simulator mode cannot be carried out at least temporarily (e.g., because onboard electrical power is not adequate for this), then the method is continued with method step S1. Otherwise, the method can be continued with a method step S2, by which the brake system is operated in the (above-described) simulator mode.

Moreover, using the method described here a transition of the brake system from the fallback mode/method step S1 to simulator mode/method step S2 can be made pleasant for the driver. As explained above, in the existing art, for brakings in which the fallback mode/method step S1 is aborted, during the respective braking, through opening of the simulator isolating valve and simultaneous closing of the at least one brake circuit isolating valve, a braking characteristic is present according to a mode change characteristic curve $g_{change}$ indicated by a graph $g_{change}$. The method described here avoids this disadvantage in that (at least sometimes) a method step S3 is carried out between the operation of the brake system in fallback mode (method step S1) and the operation of the brake system in simulator mode (method step S2).

Figure 2C:
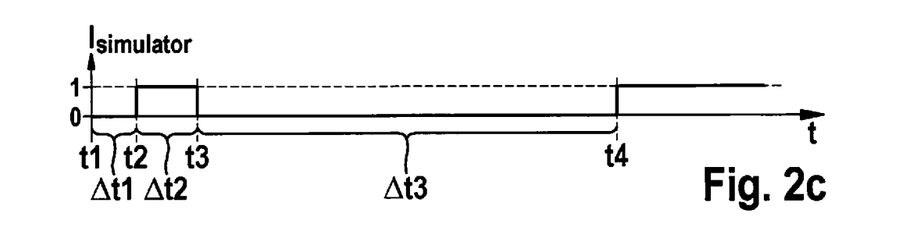
Figure 2D:
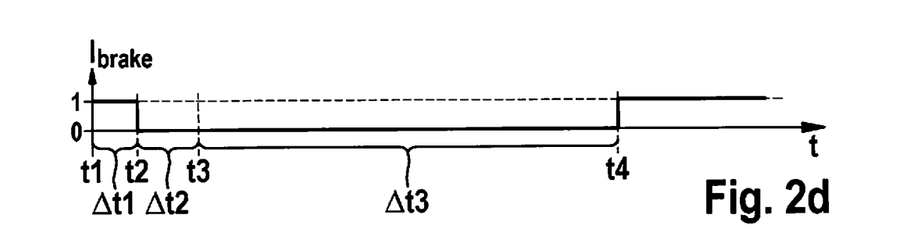
Figure 2E:
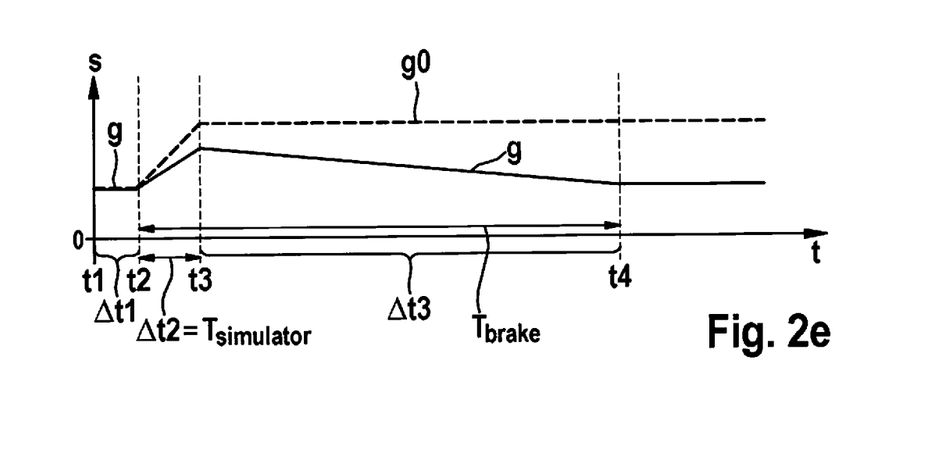
Figure 3A:
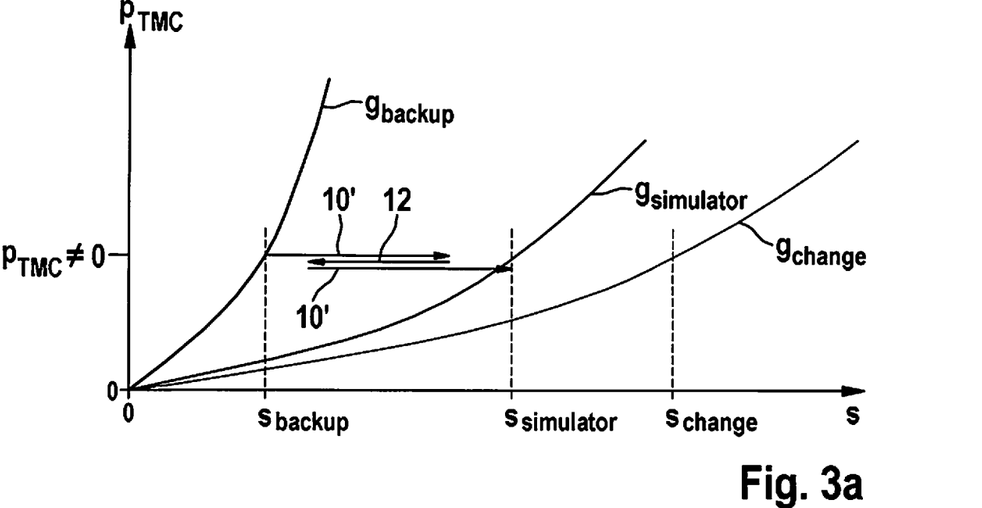
FIGS. 3a-3d are graphs illustrating a second example embodiment of the present invention of a method for operating a simulator-equipped hydraulic brake system of a vehicle.
Figure 3B:
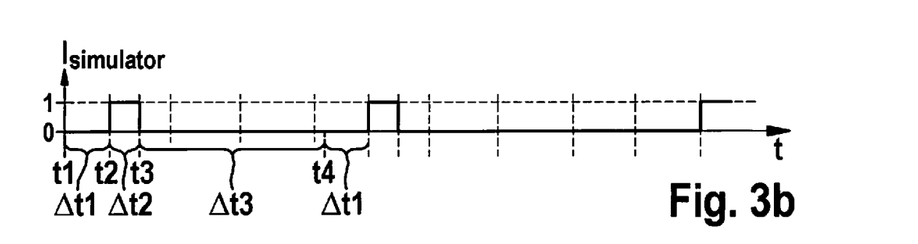
Figure 3C:
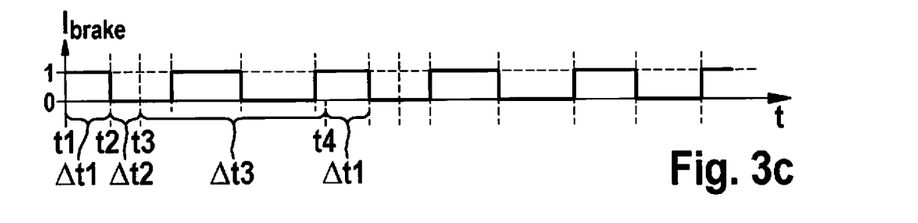
Figure 3D:
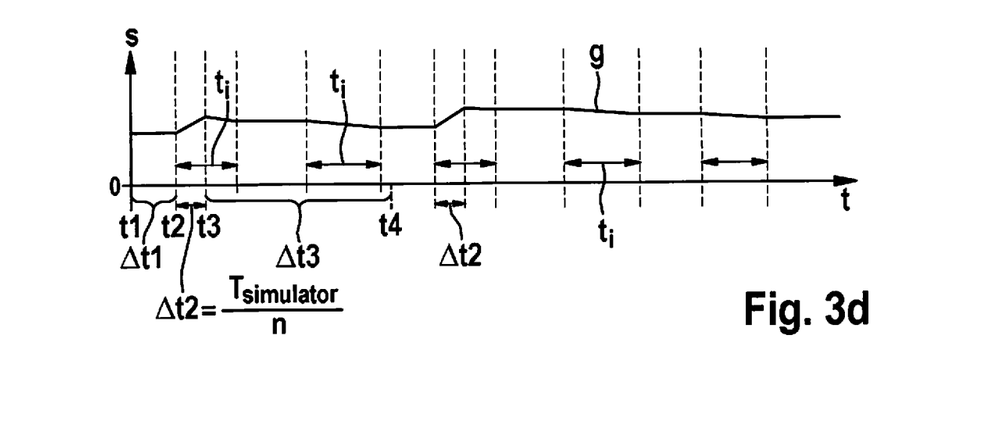

The carrying out of method step S3 is shown in the coordinate systems of FIGS. 2c-2e, where an abscissa of the coordinate systems of FIGS. 2c-2e is a time axis t. The ordinates of the coordinate systems of FIGS. 2c-2d show a current strength $I_{simulator}$ provided to the simulator isolating valve (FIG. 2c) and a current strength $I_{brake}$ provided to the at least one brake circuit isolating valve (FIG. 2d). The displacement path s of the driver brake force transmission component, positioned before the master brake cylinder, from its initial position is indicated by an ordinate of the coordinate system of FIG. 2e. A graph g shows a temporal curve of displacement path s during execution of the method described here.

At the beginning of method step S3, the driver brake force transmission component is displaced from its initial position (at a master brake cylinder pressure pTMC≠0) by a displacement path $s_{backup}$. In an intermediate step S3-1 of method step S3, the simulator isolating valve and the at least one brake circuit isolating valve are held/controlled together for a specified or defined first time interval $\Delta t1$ not equal to zero. Intermediate step S3-1 is carried out between times t1 and t2, while the simulator isolating valve, fashioned as a valve closed when currentless, and the at least one brake circuit isolating valve, fashioned as a valve open when currentless, are together held/controlled to be closed, the former by a current strength $I_{simulator}$ (approximately) equal to zero, and the latter by a current strength $I_{brake}$ not equal to zero. As is shown by graph g, during execution of intermediate step S3-1 displacement path s does not increase.

In a further intermediate step S3-2 of method step S3, carried out between times t2 and t3 (and after expiration of first time interval $\Delta t1$), the simulator isolating valve and the at least one brake circuit isolating valve are simultaneously controlled/held open for a specified or defined second time interval $\Delta t2$ not equal to zero. The simultaneous/parallel opening of the simulator isolating valve and the brake circuit isolating valves achieves a reduction in a resulting movement of the brake actuating element/brake pedal. The carrying out of method step S3-2 therefore brings about at most a slight "yielding" of the brake actuating element/brake pedal, but no "sinking" or "slumping" of the brake actuating element/brake pedal is present, as in the existing art. (For comparison, in the coordinate system of FIG. 2e another graph g0 is shown that indicates the temporal curve of displacement path s that would occur at time t2 given abortion of fallback mode/method step S1 through opening of the simulator isolating valve and simultaneous closing of the at least one brake circuit isolating valve).

In a further intermediate step S3-3, carried out between times t3 and t4 (and after the expiration of the second interval), the simulator isolating valve is closed for a specified or defined third time interval $\Delta t3$, while the at least one brake circuit isolating valve is at least partly in its open state during the third time interval $\Delta t3$. In this way, in the method described here a brake fluid volume displaced during method step S1 from the master brake cylinder in the at least one wheel brake cylinder can flow at least partly back into the master brake cylinder, thus bringing about a "correction" of the displacement path s (in order to avoid the displacement path $s_{change}$). Starting from time t4, the desired displacement path $s_{simulator}$ of the driver brake force transmission component is therefore present. The brake system can now be operated in problem-free fashion in simulator mode (by carrying out method step S2), a braking characteristic of the brake system operated in simulator mode corresponding to simulator characteristic curve $g_{simulator}$.

As an example only, in the example embodiment described here, the at least one brake circuit isolating valve, fashioned as a valve open when currentless, is controlled/held in its open state for the entire third time interval $\Delta t3$ by a current strength $I_{brake}$ that is (approximately) equal to zero. Alternatively, however, the at least one brake circuit isolating valve can also be controlled at least once from its open state into its closed state during third time interval $\Delta t3$.

First time interval $\Delta t1$ can have a first duration between 10 ms and 100 ms. Correspondingly, second time interval $\Delta t2$ can also have a second duration between 10 ms and 100 ms. In contrast, for third time interval $\Delta t3$ a third duration between 50 ms and 500 ms is preferred. First time interval Δt1 and second time interval Δt2 can for example each be 50 ms long, while third time interval Δt3 can be approximately 200 ms. The numerical values named here are however to be understood only as examples.

Method step S3 brings about an intermediate mode that is often advantageous when there is a transition of the brake system from fallback mode/method step S1 to simulator mode/method step S2. For this reason, when there is a transition of the brake system from fallback mode/method step S1 to simulator mode/method step S2, the brake system is at least sometimes operated in intermediate mode via method step S3, intermediate steps S3-1 to S3-3 being carried out at least once. As an example only, in the example embodiment described here intermediate steps S3-1 to S3-3 are run through only once (per method step S3).

Advantageously, in the method described here, before the transition of the brake system from fallback mode/method step S1 to simulator mode/method step S2, first a method step S4 is carried out. In method step S4, the (current) displacement path s of the driver brake force transmission component (from its initial position), positioned before the master brake cylinder, is compared with a specified boundary displacement path, and/or the current master brake cylinder pressure $p_{TMC}$ in the master brake cylinder is compared with a specified boundary master brake cylinder pressure. If the (current) displacement path s of the driver brake force transmission component is above the specified boundary displacement path, and/or the (current) master brake cylinder pressure $p_{TMC}$ is above the specified boundary master brake cylinder pressure, then the brake system is transitionally operated in intermediate mode, via method step S3, and the method continues with method step S2 only after method step S3. Otherwise, i.e., if the (current) displacement path s of the driver brake force transmission component is above the specified boundary displacement path, and/or the (current) master brake cylinder pressure $p_{TMC}$ is below the specified boundary master brake cylinder pressure, the transition of the brake system from fallback mode/method step S1 to simulator mode/method step S2 is brought about by opening the simulator isolating valve and simultaneously closing the at least one brake circuit isolating valve. This can also be described as an "immediate transition" from method step S1 to method step S2 (bypassing method step S3). The boundary displacement path and/or the boundary master brake cylinder pressure can reliably be defined such that only when the driver brake force transmission component is displaced by the boundary displacement path, and/or the boundary master brake cylinder pressure is present in the master brake cylinder, is a brake fluid volume displaced out of the master brake cylinder through the at least one brake circuit isolating valve (open during fallback mode/method step S1) that is large enough that the "immediate transition" from method step S1 to method step S2 (bypassing method step S3) would trigger reactions of the brake actuating element that the driver would experience as disturbing. Alternatively, however, execution of method step S4 can be omitted, and method step S3 can always be carried out when there is a transition of the brake system from fallback mode/method step S1 to simulator mode/method step S2.

As an additional development, method step S3 can also include a substep S3-0 carried out before the at least one-time carrying out of intermediate steps S3-1 to S3-3. In substep S3-0, a first target (overall) opening time $T_{simulator}$ of the simulator isolating valve during intermediate mode/method step S3 is defined, and a second target (overall) opening time $T_{brake}$ of the at least one brake circuit isolating valve during the intermediate mode/method step S3 is defined, taking into account the (current) master brake cylinder pressure $p_{TMC}$, the fallback characteristic curve $g_{backup}$ (as the relationship between displacement path s of the driver brake force transmission component and master brake cylinder pressure $p_{TMC}$ for brakings carried out completely in fallback mode), the simulator characteristic curve $g_{simulator}$ (as the relationship between displacement path s of the driver brake force transmission component and master brake cylinder pressure $p_{TMC}$ for brakings carried out completely in simulator mode), and mode change characteristic curve $g_{change}$ (as the relationship between displacement path s of the driver brake force transmission component and master brake cylinder pressure $p_{TMC}$ for brakings in which the fallback mode is aborted, during the respective braking, through opening of the simulator isolating valve and simultaneous closing of the at least one brake circuit isolating valve). In the following, it is assumed that the driver brake force transmission component is the piston rod of the master brake cylinder. (Otherwise, displacement path s of some other type of driver brake force transmission, such as an input rod, can easily be converted to a "piston rod displacement path.")

Equation 1 indicates a relationship of a volume $V_{exit}$ pressed out from the master brake cylinder as a function of displacement path s of the piston rod:

$$V_{exit} = A * s,$$ Eq. 1:

where A is a braking surface of the piston rod.

From master brake cylinder pressure $p_{TMC}$ and characteristic curves $g_{backup}$, $g_{simulator}$, and $g_{change}$, the corresponding displacement paths $s_{backup}$, $s_{simulator}$, and $s_{change}$ can be determined. In this way a first volume $V_{TMC \to S}$ can be determined that is to be displaced from the master brake cylinder into the simulator via the open simulator isolating valve until the same pressure is set in the simulator as in the master brake cylinder. From Equation 1, Equation 2 thus results:

$$V_{TMC \to S} = A*(s_{change} - s_{backup}).$$ Eq. 2:

Correspondingly, a second volume $V_{brake \to TMC}$ that is to be displaced into the master brake cylinder (as a "correction") via the at least one open brake circuit isolating valve in order to ensure a braking characteristic of the brake system, continuing to operate in simulator mode, in accordance with the simulator characteristic curve $g_{simulator}$, can be determined by Equation 3:

$$V_{brake \to TMC} = A*(s_{simulator} - s_{change}).$$ Eq. 3

Equation 3 enables a "volume correction" that transfers a "missing volume" of the master brake cylinder back into the master brake cylinder from the at least one wheel brake cylinder/brake circuit.

Via the volumes $V_{TMC \to S}$ and $V_{brake \to TMC}$, the target (overall) opening times $T_{simulator}$ and $T_{brake}$ can be defined for the simulator isolating valve and the at least one brake circuit isolating valve. In the determination of the target (overall) opening times $T_{simulator}$ and $T_{brake}$, a volume flow $Q_{simulator}$ and $Q_{brake}$ through the respective valves, according to the known Bernoulli equations (Equation 4 and Equation 5) are also to be taken into account:

$$Q_{simulator} = k_{simulator} * \sqrt{\Delta p_{simulator}}$$ Eq. 4:

$$Q_{brake} = k_{brake} * \sqrt{\Delta p_{brake}}$$ Eq. 5:

where $k_{simulator}$ and $k_{brake}$ are valve characteristic values that are known for each valve type. $\Delta p_{simulator}$ and $\Delta p_{brake}$ are pressure differences prevailing at the respective valve.

In this way, there result the target (overall) opening times $T_{simulator}$ and $T_{brake}$ of the valves, according to Equations 6 and 7:

$$T_{simulator} = \frac{V_{TMC \to S}}{Q_{simulator}} \quad \text{Eq. 6}$$

$$T_{brake} = \frac{V_{brake \to TMC}}{Q_{brake}} \quad \text{Eq. 7}$$

Via substep S3-0, in this way the target (overall) opening times $T_{simulator}$ and $T_{brake}$ can be optimized in such a way that the method can be continued in timely fashion with method step S2. FIGS. 3a-3d show coordinate systems illustrating a second specific embodiment of the method for operating a simulator-equipped hydraulic brake system of a vehicle. With regard to the abscissas and ordinates of the coordinate systems of FIGS. 3a-3d, reference is made to the coordinate systems of FIGS. 2b-2e.

The example embodiment shown here differs from the method described above in that, when there is a transition of the brake system from fallback mode/method step S1 to simulator mode/method step S2, during the respective intermediate mode/method step S3 the intermediate steps S3-1 and S3-3 are carried out n times, where n is a whole number and is greater than or equal to 2. The duration of second time interval Δt2 is therefore equal to a quotient of the first target (overall) opening time $T_{simulator}$ of the simulator isolating valve, divided by n, defined according to Equation 8:

$$\Delta t2 = \frac{T_{simulator}}{n} \quad \text{Eq. 8}$$

The individual opening times $t_i$ of the at least one brake circuit isolating valve are defined correspondingly, and it is additionally taken into account how many of the at least one brake circuit isolating valve are present in the brake system, and how often the at least one brake circuit isolating valve is closed per intermediate step S3-3.

The example embodiment described here thus enables a "correction" in a plurality of steps, from which there results a minimal movement of the brake actuating element/brake pedal. (This is shown by the division of arrow 10 into the individual arrows 10', and their superposition with arrow 12 in FIG. 3a.)

Figure 4:
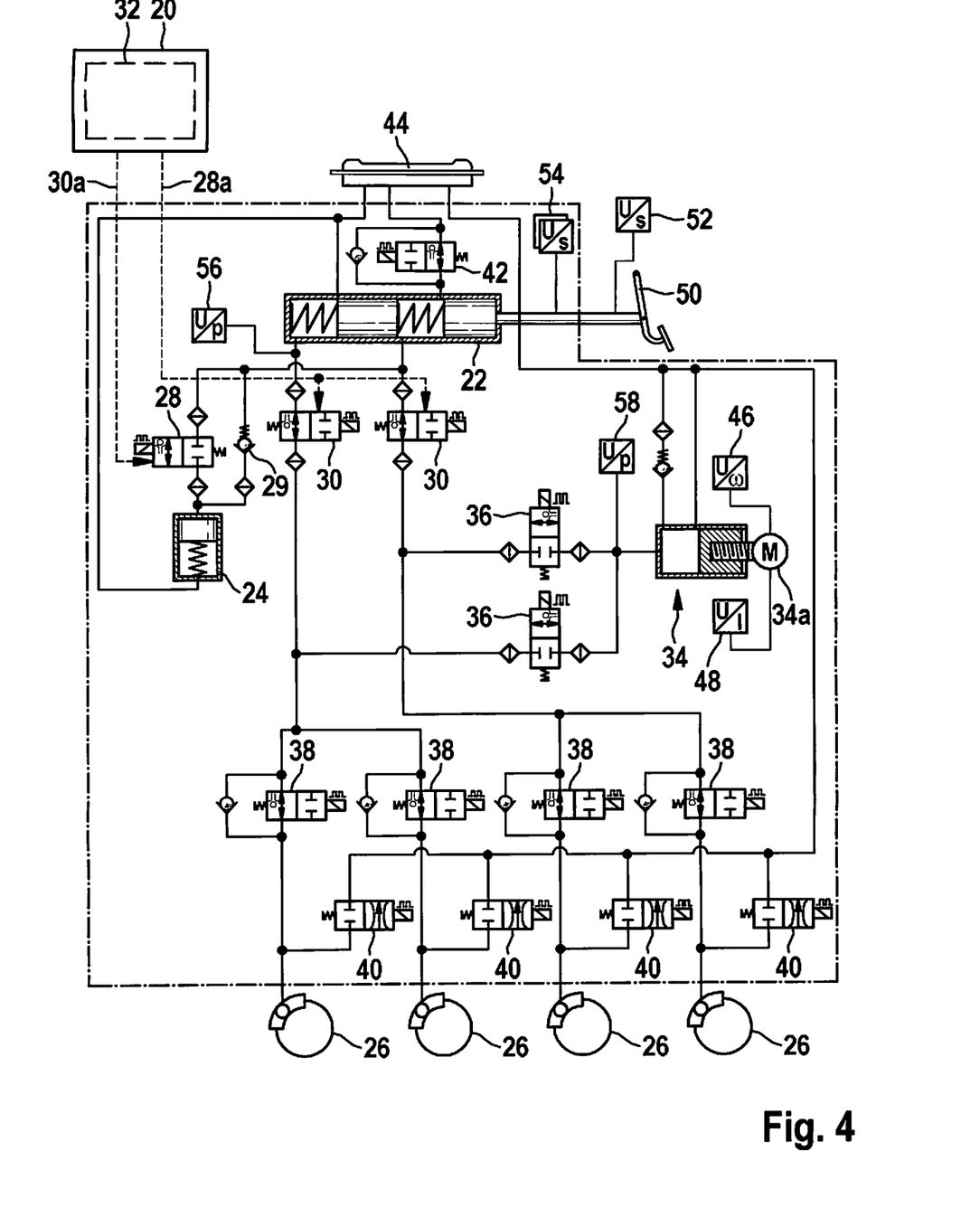
FIG. 4 is a diagram that schematically represents a control device and/or simulator-equipped hydraulic system formed therewith, according to an example embodiment of the present invention.

FIG. 4 shows a schematic representation of the control device, or of the simulator-equipped hydraulic brake system formed therewith.

The applicability of control device 20 is not limited to the brake system shown in FIG. 4. Instead, control device 20 can be used with any brake system type that includes at least one master brake cylinder 22, a simulator 24, at least one wheel brake cylinder 26, a simulator isolating valve 28 via which simulator 24 is connected to master brake cylinder 22, and at least one brake circuit isolating valve 30 via which the at least one wheel brake cylinder 26 is connected to master brake cylinder 22. (In the example embodiment of FIG. 4, simulator 24 is connected, again only as an example, to master brake cylinder 22 via an excess pressure valve 29 situated parallel to simulator isolating valve 28.)

Control device 20 has an electronics device 32 that is designed at least to control simulator isolating valve 28 (via at least one first control signal 28a) and the at least one brake circuit isolating valve 30 (via at least one second control signal 30a) in such a way that the brake system can optionally be operated in a fallback mode, during which simulator isolating valve 20 is in its closed state and the at least one brake circuit isolating valve 30 is in its open state, or in a simulator mode during which simulator isolating valve 28 is in its open state and the at least one brake circuit isolating valve 30 is in its closed state. Moreover, electronics device 32 is designed, when there is a transition of the brake system from the fallback mode to the simulator mode, to control simulator isolating valve 28 and the at least one brake circuit isolating valve 30 as an intermediate mode in such a way that a valve switching program can be carried out at least once for which it is the case that simulator isolating valve 28 and the at least one brake circuit isolating valve 30 are together in their closed state for a specified or defined first time interval (not equal to zero), simulator isolating valve 28 and at least one brake circuit isolating valve 30 are simultaneously in their open state after expiration of the first time interval for a specified or defined second time interval (not equal to zero), and simulator isolating valve 28 is in its closed state, after expiration of the second time interval, for a specified or defined third time interval (not equal to zero), the at least one brake circuit isolating valve 30 being in its open state at least part of the time during the third time interval. In this way, control device 20 also brings about a transition of the brake system from the fallback mode to the simulator mode that is comfortable for the driver.

Control device 20 can also be designed to carry out the method steps described above. However, a repeated description of the method steps is omitted here.

As an advantageous development, control device 20 can also be designed to control at least one further brake system component of the brake system. For example, electronics device 32 can be designed to control, during the simulator mode, a motorized brake pressure buildup device 34 in order to bring about a requested brake pressure buildup in the at least one wheel brake cylinder 26. In the specific embodiment of FIG. 4, the motorized brake pressure buildup device is a piston-cylinder device (plunger device) 34, having a motor 34a. However, it is to be noted that such a design of motorized brake pressure buildup device 34 is to be interpreted only as an example. For example, motorized brake pressure buildup device 34 can also be at least one pump of the brake system. The examples listed here for motorized brake pressure buildup device 34 are also to be interpreted only as examples. At least one isolating valve 36, via which motorized brake pressure buildup device 34 is connected to the at least one wheel brake cylinder 26, can also be controllable/switchable by electronics device 32. At least one wheel inlet valve 38, assigned to the at least one wheel brake cylinder 26, and/or at least one wheel outlet valve 40, assigned to the at least one wheel brake cylinder 26, can also be controllable/switchable by electronics device 32. In addition, a reservoir isolating valve 42, via which master brake cylinder 22 is connected to a brake fluid reservoir 44, can also be controllable/switchable by electronics device 32.

In addition, at least one sensor signal can also be capable of being evaluated by electronics device 32. For example, a rotational rate sensor 46 of motorized brake pressure buildup device 34, a motor current sensor 48 of motorized brake pressure buildup device 34, a rod path sensor 52 situated on a brake actuating element/brake pedal 50, a difference path sensor 54, a pre-pressure sensor 56, and a pressure sensor 58 connected to motorized brake pressure buildup device 34 can be capable of being evaluated by electronics device 32.

What is claimed is:

1. A control device for a simulator-equipped hydraulic brake system of a vehicle, comprising:
an electronic device configured to control (a) a simulator isolating valve, via which a simulator of the brake system is connected to a master brake cylinder of the brake system, and (b) at least one brake circuit isolating valve, via which at least one wheel brake cylinder of the brake system is connected to the master brake cylinder, in such a way that the brake system can be operated in a fallback mode, in a simulator mode, and in an intermediate mode during a transition from the fallback mode to the simulator mode, wherein:
in the fallback mode, the simulator isolating valve is in a closed state and the at least one brake circuit isolating valve is in an open state;
in the simulator mode, the simulator isolating valve is in an open state and the at least one brake circuit isolating valve is in a closed state;
in the intermediate mode, a valve switching program is carried out at least once; and
the valve switching program includes:
the simulator isolating valve and the at least one brake circuit isolating valve are controlled to be simultaneously in their closed states for a specified or defined first time interval not equal to zero;
the simulator isolating valve and the at least one brake circuit isolating valve are controlled to be simultaneously in their open states, after expiration of the first time interval, for a specified or defined second time interval not equal to zero; and
after the expiration of the second time interval:
the simulator isolating valve is controlled to be in its closed state for a specified or defined third time interval not equal to zero; and
the at least one brake circuit isolating valve is controlled to be in its open state during at least part of the third time interval.

2. The control device of claim 1, wherein the electronics device is configured to:
before the transition of the brake system from the fallback mode to the simulator mode, compare (a) a current displacement path of a driver brake force transmission component of the brake system positioned upstream of the master brake cylinder from an initial position of the driver brake force transmission component, to (b) a specified boundary displacement path;
implement the intermediate mode in response to a result of the comparison being that the current displacement path of the driver brake force transmission component is above the specified boundary displacement path; and
in response to the result of the comparison being that the current displacement path of the driver brake force transmission component is not above the specified boundary displacement path, bring about the transition of the brake system from the fallback mode to the simulator mode by opening the simulator isolating valve and simultaneously closing the at least one brake circuit isolating valve.

3. The control device of claim 1, wherein the electronics device is configured to:
before the transition of the brake system from the fallback mode to the simulator mode, compare (a) a current master brake cylinder pressure in the master brake cylinder, to (b) a specified boundary master brake cylinder pressure;
implement the intermediate mode in response to a result of the comparison being that the current master brake cylinder pressure is above the specified boundary master brake cylinder pressure; and
in response to the result of the comparison being that the current master brake cylinder pressure is not above the specified boundary master brake cylinder pressure, bring about the transition of the brake system from the fallback mode to the simulator mode by opening the simulator isolating valve and simultaneously closing the at least one brake circuit isolating valve.

4. The control device of claim 3, further comprising:
a storage unit storing:
a fallback characteristic curve that indicates a relationship between the displacement path of the driver brake force transmission component and a resulting master brake cylinder pressure for brakings carried out completely in the fallback mode;
a simulator characteristic curve that indicates a relationship between the displacement path of the driver brake force transmission component and a resulting master brake cylinder pressure for brakings carried out completely in the simulator mode; and
a mode change characteristic curve that indicates a relationship between the displacement path of the driver brake force transmission component and a resulting master brake cylinder pressure for brakings in which the fallback mode is aborted, during a respective braking, through opening of the simulator isolating valve and simultaneous closing of the at least one brake circuit isolating valve;
wherein the electronics device is configured to determine a first target opening time of the simulator isolating valve during the intermediate mode and a second target opening time of the at least one brake circuit isolating valve during the intermediate mode based on the fallback characteristic curve, the simulator characteristic curve, the mode change characteristic curve, and the current master brake cylinder pressure.

5. The control device of claim 1, wherein:
the electronics device is configured to carry out the valve switching program 'n' times during the intermediate mode when there is a transition of the brake system from the fallback mode to the simulator mode;
'n' is a whole number greater than or equal to 2; and
the electronics device is configured to define a duration of the second time interval to be equal to a quotient of the first target opening time of the simulator isolating valve divided by 'n'.

6. A hydraulic brake system for a vehicle, the system comprising:
a master brake cylinder;
a simulator;
at least one wheel brake cylinder;
a simulator isolating valve via which the simulator is connected to the master brake cylinder;
at least one brake circuit isolating valve via which the at least one wheel brake cylinder is connected to the master brake cylinder; and
an electronic device configured to control the simulator isolating valve and the at least one brake circuit isolating valve such that the brake system can be operated in a fallback mode, in a simulator mode, and in an intermediate mode during a transition from the fallback mode to the simulator mode, wherein:

in the fallback mode, the simulator isolating valve is in a closed state and the at least one brake circuit isolating valve is in an open state;

in the simulator mode, the simulator isolating valve is in an open state and the at least one brake circuit isolating valve is in a closed state;

in the intermediate mode, a valve switching program is carried out at least once; and the valve switching program includes:

the simulator isolating valve and the at least one brake circuit isolating valve are controlled to be simultaneously in their closed states for a specified or defined first time interval not equal to zero;

the simulator isolating valve and the at least one brake circuit isolating valve are controlled to be simultaneously in their open states, after expiration of the first time interval, for a specified or defined second time interval not equal to zero; and after the expiration of the second time interval:

the simulator isolating valve is controlled to be in its closed state for a specified or defined third time interval not equal to zero; and the at least one brake circuit isolating valve is controlled to be in its open state during at least part of the third time interval.

7. A method for operating a simulator-equipped hydraulic brake system of a vehicle, the method comprising:

operating the brake system in a fallback mode, during which a simulator isolating valve, via which a simulator of the brake system is connected to a master brake cylinder of the brake system, is in a closed state and at least one brake circuit isolating valve, via which at least one wheel brake cylinder of the brake cylinder is connected to the master brake cylinder, is in an open state;

operating the brake system in a simulator mode during which the simulator isolating valve is in an open state and the at least one brake circuit isolating valve is in a closed state; and transitioning from the fallback mode to the simulator mode by implementing an intermediate mode in which a switching program is executed by which:

the simulator isolating valve and the at least one brake circuit isolating valve are simultaneously in their closed states for a defined first time interval not equal to zero;

the simulator isolating valve and the at least one brake circuit isolating valve are simultaneously in their open states for a defined second time interval not equal to zero, after expiration of the first time interval; and after expiration of the second time interval, the simulator isolating valve is in its closed state for a defined third time interval not equal to zero, and the at least one brake circuit isolating valve is in its open state at least some of the time during the third time interval.

8. The method of claim 7, further comprising:

before the transition of the brake system from the fallback mode to the simulator mode, comparing (a) a current displacement path of a driver brake force transmission component of the brake system positioned upstream of the master brake cylinder from an initial position of the driver brake force transmission component, to (b) a specified boundary displacement path;

wherein:

the intermediate mode is implemented in response to a result of the comparison being that the current displacement path of the driver brake force transmission component is above the specified boundary displacement path; and the method further comprises, in response to the result of the comparison being that the current displacement path of the driver brake force transmission component is not above the specified boundary displacement path, bringing about the transition of the brake system from the fallback mode to the simulator mode by opening the simulator isolating valve and simultaneously closing the at least one brake circuit isolating valve.

9. The method of claim 7, further comprising:

before the transition of the brake system from the fallback mode to the simulator mode, comparing (a) a current master brake cylinder pressure in the master brake cylinder, to (b) a specified boundary master brake cylinder pressure;

wherein:

the intermediate mode is implemented in response to a result of the comparison being that the current master brake cylinder pressure is above the specified boundary master brake cylinder pressure; and the method further comprises, in response to the result of the comparison being that the current master brake cylinder pressure is not above the specified boundary master brake cylinder pressure, bringing about the transition of the brake system from the fallback mode to the simulator mode by opening the simulator isolating valve and simultaneously closing the at least one brake circuit isolating valve.

10. The method of claim 9, further comprising:

storing:

a fallback characteristic curve that indicates a relationship between the displacement path of the driver brake force transmission component and a resulting master brake cylinder pressure for brakings carried out completely in the fallback mode;

a simulator characteristic curve that indicates a relationship between the displacement path of the driver brake force transmission component and a resulting master brake cylinder pressure for brakings carried out completely in the simulator mode; and a mode change characteristic curve that indicates a relationship between the displacement path of the driver brake force transmission component and a resulting master brake cylinder pressure for brakings in which the fallback mode is aborted, during a respective braking, through opening of the simulator isolating valve and simultaneous closing of the at least one brake circuit isolating valve; and determining a first target opening time of the simulator isolating valve during the intermediate mode and a second target opening time of the at least one brake circuit isolating valve during the intermediate mode based on the fallback characteristic curve, the simulator characteristic curve, the mode change characteristic curve, and the current master brake cylinder pressure.

11. The method of claim 7, wherein:

the switching program is implemented 'n' times during the intermediate mode when there is a transition of the brake system from the fallback mode to the simulator mode;

'n' is a whole number greater than or equal to 2; and
the method further comprises defining a duration of the second time interval to be equal to a quotient of the first target opening time of the simulator isolating valve divided by 'n'.

\* \* \* \* \*